United States Patent
Lee et al.

(10) Patent No.: US 11,024,880 B2
(45) Date of Patent: Jun. 1, 2021

(54) ELECTROLYTE FOR LITHIUM SECONDARY BATTERY AND LITHIUM SECONDARY BATTERY INCLUDING THE SAME

(71) Applicants: Hyundai Motor Company, Seoul (KR); Kia Motors Corporation, Seoul (KR)

(72) Inventors: Yoon Sung Lee, Gyeonggi-do (KR); KiSeok Koh, Gyeonggi-Do (KR); Jung Young Cho, Seoul (KR); Ikkyu Kim, Gyeonggi-Do (KR); Yeolmae Yeo, Gyeonggi-Do (KR); Seung-Min Oh, Incheon (KR); Sa Heum Kim, Gyeonggi-do (KR); Sungmin Choi, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 62 days.

(21) Appl. No.: 16/140,824

(22) Filed: Sep. 25, 2018

(65) Prior Publication Data

US 2019/0372162 A1 Dec. 5, 2019

(30) Foreign Application Priority Data

May 29, 2018 (KR) .......................... 10-2018-0061204

(51) Int. Cl.
| | |
|---|---|
| *H01M 10/0567* | (2010.01) |
| *B60L 50/64* | (2019.01) |
| *B60K 6/28* | (2007.10) |
| *H01M 4/505* | (2010.01) |
| *H01M 4/525* | (2010.01) |
| *H01M 10/0525* | (2010.01) |
| *H01M 10/0568* | (2010.01) |
| *H01M 10/42* | (2006.01) |
| *H01M 4/02* | (2006.01) |
| *H01M 10/0564* | (2010.01) |
| *H01M 10/056* | (2010.01) |

(52) U.S. Cl.
CPC .......... *H01M 10/0567* (2013.01); *B60K 6/28* (2013.01); *B60L 50/64* (2019.02); *H01M 4/505* (2013.01); *H01M 4/525* (2013.01); *H01M 10/0525* (2013.01); *H01M 10/0568* (2013.01); *H01M 10/4235* (2013.01); *B60Y 2200/91* (2013.01); *B60Y 2200/92* (2013.01); *H01M 10/056* (2013.01); *H01M 10/0564* (2013.01); *H01M 2004/028* (2013.01); *H01M 2300/0025* (2013.01)

(58) Field of Classification Search
None
See application file for complete search history.

(56) References Cited

U.S. PATENT DOCUMENTS

| | | | |
|---|---|---|---|
| 2003/0003370 A1 | 1/2003 | Arai et al. | |
| 2004/0106039 A1 | 6/2004 | Arai et al. | |
| 2015/0017511 A1 | 1/2015 | Schmitz et al. | |
| 2015/0044551 A1 | 2/2015 | Taki et al. | |
| 2016/0164060 A1* | 6/2016 | Zhang | H01M 2/1613 429/145 |

FOREIGN PATENT DOCUMENTS

| | | |
|---|---|---|
| EP | 3 051 618 A1 | 8/2016 |
| JP | H0620705 A | 1/1994 |
| JP | 2017191634 A | 10/2017 |
| KR | 10-0446928 B1 | 9/2004 |
| KR | 10-2014-0096259 A | 10/2012 |
| WO | 2014/017321 A1 | 1/2014 |
| WO | 2016/013480 A1 | 1/2016 |
| WO | 2016/076145 A1 | 5/2016 |
| WO | 2017-047626 A1 | 3/2017 |

OTHER PUBLICATIONS

Extended European Search Report for EP Patent Application No. 18199122, dated Mar. 1, 2019, 10 pages.

* cited by examiner

*Primary Examiner* — Jeremiah R Smith

(74) *Attorney, Agent, or Firm* — Mintz Levin Cohn Ferris Glovsky; Peter F. Corless

(57) ABSTRACT

Disclose are an electrolyte composite for a lithium secondary battery having an improved output; a cathode including a protective film on its surface; and a lithium secondary battery comprising the same.

7 Claims, 5 Drawing Sheets

ELECTROLYTE FOR LITHIUM SECONDARY BATTERY AND LITHIUM SECONDARY BATTERY INCLUDING THE SAME

CROSS-REFERENCE TO RELATED APPLICATION

This application is based on and claims priority under 35 U.S.C. § 119 to Korean Patent Application No. 10-2018-0061204, filed on May 29, 2018, in the Korean Intellectual Property Office, the entire contents of which are incorporated by reference herein in its entirety.

TECHNICAL FIELD

The present invention relates to an electrolyte for a lithium secondary battery, and a lithium secondary battery including the electrolyte composite.

BACKGROUND

In general, a lithium secondary battery has a high operating voltage and high energy density since it contains an electro-active material, compared to a conventional lead battery or a nickel/cadmium battery. Accordingly, the lithium secondary battery has been used as major energy storage means for Electric Vehicle (EV) and Hybrid Electric Vehicle (HEV).

In order to improve fuel efficiency of an electric vehicle, the densification of battery energy is most important. For the densification of battery energy, it is necessary to improve the energy density of a material used in the battery. Lately, a lithium secondary battery using a Ni, Co, or Mn positive electrode material and a graphite negative electrode is being developed. However, an electrolyte composite capable of improving output and life characteristics needs to be developed.

SUMMARY OF THE INVENTION

In preferred aspects, provided are an electrolyte composite for a lithium secondary battery with improved output and life characteristics and a lithium secondary battery including the electrolyte composite.

In an aspect, a lithium secondary battery may include: a positive electrode including a positive active material; a negative electrode including a negative active material; a separation film disposed between the positive electrode and the negative electrode; and an electrolyte. In particular, the electrolyte may include: lithium salt; and an additive including at least one of bis(trimethylsilyl)fumarate and bis(trimethylsilyl)thiophene-2,5-dicarboxylate. The electrolyte may further include a solvent.

The electrolyte may suitably include an amount of about 10 weight percentage (wt %) or less (but greater than zero) with respect to the total weight of the electrolyte.

The electrolyte may suitably include an amount of about 0.2 wt % to 3 wt % with respect to the total weight of the electrolyte.

The additive may further include trimethyl(phenyl)silane.

The electrolyte may suitably include an amount of about 10 wt % or less (but greater than zero) with respect to the total weight of the electrolyte.

The additive may suitably include, for example, trimethyl(phenyl)silane in an amount of about 0.5 wt % to 5 wt % with respect to the total weight of the electrolyte.

The additive may further suitably include, for example, vinylene carbonate (VC).

The additive in which at least one of Bis(trimethylsilyl) fumarate and Bis(trimethylsilyl)thiophene-2,5-dicarboxylate is mixed together with Vinylene Carbonate (VC) and Trimethyl(phenyl)silane may suitably be in an amount of about 10 wt % or less (but greater than zero) with respect to the total weight of the electrolyte.

A total content of the additive in which at least one of bis(trimethylsilyl) fumarate and bis(trimethylsilyl) thiophene-2,5-dicarboxylate is mixed together with vinylene carbonate (VC) and trimethyl(phenyl)silane may be in an amount of about 0.5 wt % to 1.5 wt % with respect to the total weight of the electrolyte.

The lithium salt may include one or more materials selected from the group consisting of $LiPF_6$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$ (LiFSI) and $(CF_3SO_2)_2NLi$.

The solvent may include one or more materials that will not prevent desired functions of the composition (e.g., electrolyte composition) and may suitably include, for example, one or more materials selected from the group consisting of ethylene carbonate (EC), diethyl carbonate (DEC), dimethyl carbonate (DMC), propylene carbonate (PC), dipropyl carbonate (DPC), buthylene carbonate (BC), methyl propyl carbonate (MPC), ethyl propyl carbonate (EPC), and ethyl methyl carbonate (EMC).

The positive active material may suitably include, for example, a lithium ternary (Ni—Mn—Co) positive active material having a Ni content in an amount of about 30 wt % to 100 wt % with respect to the total weight of the positive active material.

The separation film may suitably include, for example, a ceramic coating separation film.

An electrolyte composite for a lithium secondary battery according to another aspect of the present invention may include: a lithium salt; a solvent; and an additive including bis(trimethylsilyl)fumarate or bis(trimethylsilyl)thiophene-2,5-dicarboxylate. The composite may suitably further include a solvent or a solvent component.

The electrolyte may suitably include the additive in an amount of about 0.2 wt % to 3 wt % with respect to the total weight of the electrolyte composite.

The additive may further suitably include, for example, trimethyl(phenyl)silane.

The electrolyte may suitably include, for example, the trimethyl(phenyl)silane in an amount of about 0.5 wt % to 5 wt % with respect to the total weight of the electrolyte composite.

The additive may further suitably include, for example, vinylene carbonate (VC).

A content of an additive in which at least one of bis (trimethylsilyl) fumarate and bis(trimethylsilyl) thiophene-2,5-dicarboxylate is mixed together with Vinylene Carbonate (VC) and Trimethyl(phenyl)silane may suitably be in an amount of about 1 wt % to 2.5 wt % with respect to the total weight of the electrolyte composite.

Further provided is a vehicle that may include the lithium secondary battery as described herein.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
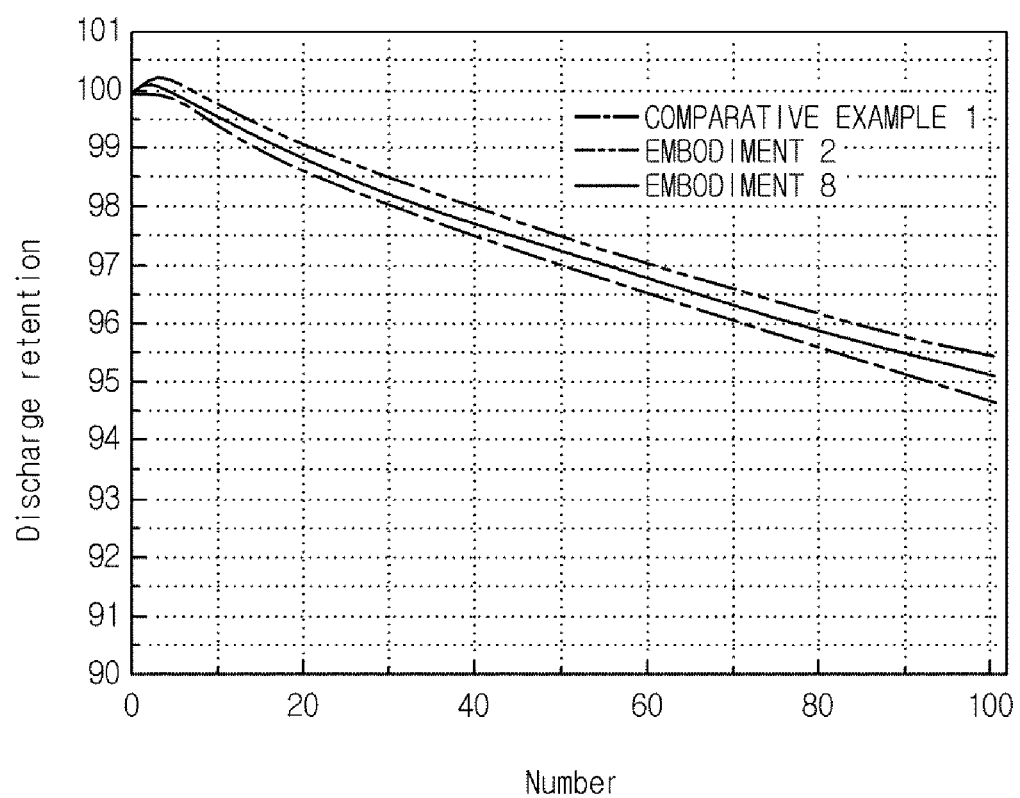
FIG. 1 shows discharge retention (%) of an exemplary lithium secondary battery according to an exemplary embodiment of the present invention.

Like reference numerals refer to like elements throughout this specification. This specification does not describe all components of embodiments, and general information in the technical field to which the present disclosure belongs or overlapping information between the embodiments will not be described.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the embodiments of the present invention will be described in detail with reference to the accompanying drawings and tables. For instance, provided are a lithium secondary battery to which an exemplary electrolyte for a lithium secondary battery according to an exemplary embodiment of the present invention is applied, and the electrolyte for the lithium secondary battery.

A lithium secondary battery may include lithium transition metal oxide (for example, $LiCoO_2$) as a positive active material, and a carbon or graphite material as a negative active material, and an electrolyte functioning as a transfer path of lithium ions may include a carbonate organic solvent that is stable even at a relatively high voltage.

During charging of the battery, deintercalation of lithium ions occurs from a positive active material which is a source of lithium ions so that the lithium ions move between layers of a carbon layered structure of a negative electrode functioning as a storage of lithium ions. During discharging, the lithium ions return to a positive electrode from the negative electrode to generate electricity. Accordingly, the performance of the battery may depend on activation of the lithium ions of the positive active material and whether the negative active material has sufficient space for intercalation of the lithium ions.

In the related arts, the active materials and the electrolyte cause a sub reaction to generate gas, for example, during charging/discharging, Mn and other metals may be eluted to the electrolyte to be bound with other organic materials to thus increase resistance. As consequence, lithium positive ions may be prevented from moving freely, resulting in a deterioration of the output characteristic of the battery.

Further, the education of the Mn element may become more serious upon high-temperature preservation. The eluted Mn element may be educed on the surface of the negative active material, and may receive electrons from the negative active material so that the electrolyte may be decomposed from the negative active material by a reduction reaction to thereby increase the resistance of the battery.

Generally, an electrolyte of a lithium secondary electrode contacts electrodes to cause an oxidation-reduction reaction on the interfaces. Therefore, a material, such as LiF, $Li_2CO_3$, $LiO_2$, and LiOH, may be generated to form a film (e.g., solid electrolyte interface (SEI) film) on the surface of the negative electrode.

For example, after a SEI film is formed upon initial charging, the SEI film may prevent a reaction between lithium ions and the negative electrode or another material when charging/discharging is repeated by use of the battery, and may function as an ion tunnel that passes only lithium ions between the electrolyte and the negative electrode.

Accordingly, an additive capable of forming a SEI film on the surface of an electrode has been developed to prevent the above mentioned technical difficulties.

In an aspect, provided is a lithium secondary battery that may include a positive electrode, a negative electrode, a separation film, and an electrolyte. The electrolyte may include an electrolyte composite containing lithium salt, a solvent, and an additive.

Typically used positive electrode, the negative electrode, and the separation film constituting an electrode structure in the related art may be used for manufacturing an exemplary lithium secondary battery of the present invention.

The negative active material may include any material selected from a carbon material such as graphite group that can occlude or release lithium ions, and it is not limited to a specific graphite group.

Preferably, the separation film may be formed by using a porous polymer film in a single layer or stacking a plurality of layers of the porous polymer films. For example, the porous polymer film may include a polyolefin polymer, such as an ethylene homopolymer, a propylene homopolymer, an ethylene/butane copolymer, an ethylene/hexane copolymer, and an ethylene/methacrylate copolymer. Alternatively, the separation film may include a ceramic coating, although it not limited to this.

The electrolyte composite according to an exemplary embodiment may suitably be used in a lithium secondary battery using a positive electrode including a Ni-rich positive active material, for example, a lithium ternary (Ni—Mn—Co) positive active material.

Preferably, the lithium ternary (Ni—Mn—Co) positive active material may include Ni as a main component. Nickel (Ni) as used herein may improve battery reversible capacity and a life characteristic, and the Ni content may be included in an amount of equal to 30 wt % and less than 100 wt % with respect to the total amount of the lithium ternary (Ni—Mn—Co) positive active material. Preferably, the Ni content may be an amount of about 60 wt % or greater, and in particular, the Ni content may be within a range of about 80 wt % to 90 wt % with respect to the total weight of the lithium ternary (Ni—Mn—Co) positive active material.

Hereinafter, a composition ratio of a component or components of the electrolyte for the lithium secondary battery according to an exemplary embodiment will be described in more detail. In the following description, a unit of weight percent (wt %) will be used unless otherwise noted.

An electrolyte composite for a lithium secondary battery according to an exemplary embodiment of the present invention may include lithium salt, a solvent, and an additive containing at least one of Bis(trimethylsilyl) fumarate and Bis(trimethylsilyl) thiophene-2,5-dicarboxylate.

The lithium salt may suitably include one or more materials selected from the group consisting of $LiPF_6$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N(LiFSI)$ and $(CF_3SO_2)_2NLi$.

The solvent may suitably include one or more materials selected from the group consisting of ethylene carbonate (EC), diethyl carbonate (DEC), dimethyl carbonate (DMC), propylene carbonate (PC), dipropyl carbonate (DPC), buthylene carbonate (BC), methyl propyl carbonate (MPC), ethyl propyl carbonate (EPC), and ethyl methyl carbonate (EMC).

Bis(trimethylsilyl)fumarate may be an additive for forming a stable SEI film on a surface of a negative active material. When a bis(trimethylsilyl)fumarate content is greater than a predetermined amount, resistance of the negative electrode may increase, thereby deteriorating the output. Preferably, bis(trimethylsilyl)fumarate content may be limited to about 10.0 wt % with respect to the total weight of the electrolyte composite. Preferably, the Bis(trimethylsilyl)fumarate content may be in an amount of about 0.2% to 3.0%, or particularly, in an amount of about 0.1 wt % to 0.5 wt % with respect to the total weight of the electrolyte composite.

Bis(trimethylsilyl) thiophene-2,5-dicarboxylate may be an additive for forming a stable SEI film on the surface of the negative active material. When a Bis(trimethylsilyl) thiophene-2,5-dicarboxylate content is greater than a predetermined amount, the resistance of the negative electrode may increase, thereby deteriorating the cell output. TPreferably, bis(trimethylsilyl) thiophene-2,5-dicarboxylate content may be limited to about 10.0 wt % with respect to the total weight of the electrolyte composite. Preferably, the Bis(trimethylsilyl) thiophene-2,5-dicarboxylate content may suitably be in an amount of about 0.2 wt % to 3.0 wt %, or particularly of about 0.1 wt % to 0.5 wt % with respect to the total weight of the electrolyte composite.

The electrolyte composite for the lithium secondary battery according to an exemplary embodiment may further include Trimethyl(phenyl)silane as an additive.

Since Trimethyl(phenyl)silane includes a silyl group, trimethyl(phenyl)silane as used herein may remove water in the electrolyte to suppress hydrolysis of lithium salt. Although the lithium salt in the electrolyte is hydrolyzed to produce an acid material (for example, HF), the acid material may be selectively removed by a neutral reaction of an oxidation product of trimethyl(phenyl)silane and the acid material. Furthermore, when Trimethyl(phenyl)silane is added, a stable SEI film may be formed on the surface of the positive electrode.

As described above, trimethyl(phenyl)silane may be an additive functioning to suppress elution of the transition metal as the positive active material. However, an excessive Trimethyl(phenyl)silane content may increase the cell cost, and deteriorate energy density per weight. Accordingly, trimethyl(phenyl)silane content may be limited to 10.0 wt % with respect to the total weight of the electrolyte composite. Preferably, the Trimethyl(phenyl)silane content may be in an amount of about 0.5 wt % to 5.0 wt %, or particularly in an amount of about 0.2% to 1.5%.

An electrolyte composite for a lithium secondary battery according to an exemplary embodiment of the present invention may further include vinylene carbonate (VC) together with trimethyl(phenyl)silane, as an additive.

Since vinylene carbonate (VC) having a vinyl group and a ring strain in a pentagonal structure has lower lowest unoccupied molecular orbital (UNMO) energy than an organic solvent used in an electrolyte, vinylene carbonate (VC) may have relatively high reductive degradation tendency so as to form a stable SEI film on the surface of the negative electrode.

When vinylene carbonate (VC) and trimethyl(phenyl)silane are added together, vinylene carbonate (VC) may prevent an electrolyte decomposition reaction. Also, although an electrolyte decomposition reaction occurs, the trimethyl(phenyl)silane may effectively remove an acid material (for example, HF) which is the decomposition product, thereby compensating water vulnerability.

A content of an additive in which at least one of bis(trimethylsilyl) fumarate and bis(trimethylsilyl) thiophene-2,5-dicarboxylate is mixed together with vinylene carbonate (VC) and trimethyl(phenyl)silane may be an amount of about 10 wt % or less (but greater than zero) with respect to the total weight of the electrolyte composite. Preferably, the additive content may be in an amount of about 0.5 wt % to 1.5 wt %, or particularly in an amount of about 1 wt % to 2.5 wt % with respect to the total weight of the electrolyte composite.

Hereinafter, an output characteristic and a life characteristic of an electrolyte composite for a lithium secondary battery according to an embodiment of the present invention will be described through various exemplary embodiments and comparative examples. However, the following embodiments are provided only to help understanding of the present invention, and the scope of the present invention is not limited thereto.

EXAMPLE

In order to perform a test for evaluating the output and life characteristics, electrolyte composites for a lithium secondary battery of embodiments and comparative examples according to the following composition ratios were manufactured. Additive contents of the embodiments and comparative examples are shown in Table 1 below.

Embodiments 1 to 6

A mixed solution of ethylene carbonate (EC), diethyl carbonate (DEC), and ethyl methyl carbonate (EMC) mixed at a volume ratio of 2:3:5 is mixed with 0.5 M $LiPF_6$ and 0.5 M LiFSI as lithium salt, and then bis(trimethylsilyl)fumarate is mixed as an additive of Table 1 by 0.1 wt %, 0.5 wt %, 1.0 wt %, 1.5 wt %, 2.0 wt %, and 5.0 wt % with respect to the total weight of the electrolyte, thereby manufacturing electrolytes.

Carbon powder of 95 wt % as a negative active material, Styrene-Butadiene Rubber(SBR)/CarboxyMethyl Cellulose (CMC) of 3 wt % as a binder, and Super-P of 2 wt % as a conductive material are added in $H_2O$ to manufacture a negative electrode mixture slurry. The negative electrode mixture slurry is coated on both surfaces of a copper foil, and the resultant copper foil is dried and compressed to manufacture a negative electrode.

$Li(Ni_{0.6}Co_{0.2}Mn_{0.2})O_2$ as a positive active material, polyvinylidene fluoride PVdf as a binder, and carbon as a conductive material are mixed at a weight ratio of 93:4:3, and dispersed in N-methyl-2-pyrrolidone to manufacture a positive electrode slurry. The positive electrode slurry is coated on both surfaces of an aluminum foil, and the resultant aluminum foil is dried and compressed to manufacture a positive electrode. A ceramic-coated polyolefin separation film is inserted between the negative electrode and the positive electrode to form an electrode assembly, and then the manufactured electrolyte is injected to manufacture a pouch type lithium secondary battery.

Embodiments 7 to 12

Embodiments 7 to 13 are performed in the same way as in Embodiments 1 to 6 except that bis(trimethylsilyl)thiophene-2,5-dicarboxylate is used as an additive.

Comparative Example 1

Comparative Example 1 is performed in the same way as in Embodiments 1 to 6 except that vinylene carbonate (VC) is used as an additive.

TABLE 1

| | Additive | | |
|---|---|---|---|
| | VC | Bis(trimethyl-silyl)fumarate | Bis(trimethyl-silyl)thiophene-2,5-dicarboxylate |
| Comparative Example 1 | 2 | | |
| Embodiment 1 | | 0.1 | |
| Embodiment 2 | | 0.5 | |
| Embodiment 3 | | 1 | |
| Embodiment 4 | | 1.5 | |
| Embodiment 5 | | 2.0 | |
| Embodiment 6 | | 5.0 | |
| Embodiment 7 | | | 0.1 |
| Embodiment 8 | | | 0.5 |
| Embodiment 9 | | | 1 |
| Embodiment 10 | | | 1.5 |
| Embodiment 11 | | | 2.0 |
| Embodiment 12 | | | 5.0 |

(unit: weight %)

The output and life characteristics of lithium secondary batteries manufactured under conditions of Table 1 were evaluated, and the evaluation results are shown in Table 2 below.

Capacity maintenance related to the life characteristic was calculated as follows.

Capacity maintenance at 100-th cycle=discharge capacity at 100-th cycle/discharge capacity at first cycle

TABLE 2

| | Initial Characteristic | Life Characteristic @ 100 cycles | | After High-Temperature Storage | Electrolyte Ion |
|---|---|---|---|---|---|
| | Resistance (%) | Maintenance Ratio (%) | Resistance (%) | Resistance (%) | Conductance (mS/cm) |
| Comparative Example 1 | 100 | 94.7 | 100 | 100 | 8.33 |
| Embodiment 1 | 99 | 94.5 | 100 | 100 | 8.31 |
| Embodiment 2 | 86 | 95.4 | 90 | 96 | 8.50 |
| Embodiment 3 | 87 | 95.3 | 91 | 98 | 8.35 |
| Embodiment 4 | 89 | 95.2 | 94 | 101 | 8.23 |
| Embodiment 5 | 92 | 95.1 | 93 | 103 | 8.10 |
| Embodiment 6 | 102 | 93.4 | 102 | 105 | 7.99 |
| Embodiment 7 | 99 | 94.6 | 100 | 100 | 8.30 |
| Embodiment 8 | 91 | 95.1 | 94 | 99 | 8.47 |
| Embodiment 9 | 95 | 94.9 | 95 | 100 | 8.29 |
| Embodiment 10 | 101 | 94.6 | 97 | 103 | 8.14 |
| Embodiment 11 | 105 | 93.2 | 103 | 108 | 7.91 |
| Embodiment 12 | 103 | 91.8 | 104 | 111 | 7.84 |

FIG. 1 is a graph showing the measurement results of battery life characteristics for 100 cycles according to Embodiments 2 and 8 and Comparative Example 1.

As shown in Table 2 and FIG. 1, lithium secondary batteries according to Embodiments 2 and 8 maintained high capacity of 95% or more with respect to initial capacity even after 100 cycles, compared to a lithium secondary battery according to Comparative Example 1.

An electrolyte composite according to Embodiment 1 includes bis(trimethylsilyl)fumarate of 0.1 wt %, and an initial resistance characteristic of the battery according to Embodiment 1 was measured as 99%.

An electrolyte composite according to Embodiment 2 includes bis(trimethylsilyl)fumarate of 0.5 wt %, and an initial resistance characteristic of the battery according to Embodiment 2 was measured as 86%. A resistance characteristic after 100 cycles was measured as 90%, and a resistance characteristic after high-temperature storage was measured as 96%. That is, the battery according to Embodiment 2 shows a more improved output characteristic than the battery of Comparative Example 1. Also, the battery according to Embodiment 2 shows a more improved cycle characteristic and electrolyte ion conductance than the battery of Comparative Example 1.

An electrolyte composite according to Embodiment 3 includes bis(trimethylsilyl)fumarate of 0.1 wt %, and an initial resistance characteristic of the battery according to Embodiment 3 was measured as 87%. A resistance characteristic after 100 cycles was measured as 91% and a resistance characteristic after high-temperature storage was measured as 98%. That is, the battery according to Embodiment 3 shows a more improved output characteristic than the battery of Comparative Example 1. Also, the battery of Embodiment 3 shows a more improved cycle characteristic and electrolyte ion conductance than the battery of Comparative Example 1.

An electrolyte composite according to Embodiment 4 includes bis(trimethylsilyl)fumarate of 1.5 wt %, and an initial resistance characteristic of the battery according to Embodiment 4 was measured as 89%. A resistance characteristic after 100 cycles was measured as 94%. That is, the electrolyte composite according to Embodiment 4 shows a more improved output characteristic than the battery of Comparative Example 1. Also, the battery of Embodiment 4 shows a more improved cycle characteristic than the battery of Comparative Example 1.

An electrolyte composite according to Embodiment 5 includes bis(trimethylsilyl)fumarate of 2.0 wt %, and an initial resistance characteristic of the battery according to Embodiment 5 was measured as 92%. A resistance characteristic after 100 cycles was measured as 93%. That is, the battery according to Embodiment 4 shows a more improved output characteristic than the battery of Comparative Example 1. Also, the battery of Embodiment 5 shows a more improved cycle characteristic than the battery of Comparative Example 1.

An electrolyte composite according to Embodiment 7 includes bis(trimethylsilyl)thiophene-2,5-dicarboxylate of 0.1 wt %, and an initial resistance characteristic of the battery according to Embodiment 7 was measured as 99%.

An electrolyte composite according to Embodiment 8 includes bis(trimethylsilyl)thiophene-2,5-dicarboxylate of 0.5 wt %, and an initial resistance characteristic of the battery according to Embodiment 8 was measured as 91%. A resistance characteristic after 100 cycles was measured as 94%. That is, the battery according to Embodiment 8 shows a more improved output characteristic than the battery of Comparative Example 1. Also, the battery of Embodiment 8 shows a more improved cycle characteristic and electrolyte ion conductance than the battery of Comparative Example 1.

An electrolyte composite according to Embodiment 9 includes Bis(trimethylsilyl)thiophene-2,5-dicarboxylate of 1.0 wt %, and an initial resistance characteristic of a battery according to Embodiment 9 was measured as 95%. A resistance characteristic after 100 cycles was measured as 95%. That is, the battery according to Embodiment 9 shows a more improved output characteristic than the battery of Comparative Example 1. Also, the battery of Embodiment 9 shows a more improved cycle characteristic than the battery of Comparative Example 1.

An electrolyte composite according to Embodiment 10 includes Bis(trimethylsilyl)thiophene-2,5-dicarboxylate of 1.5 wt %, and a resistance characteristic of the battery according to Embodiment 10 after 100 cycles was measured as 93%. That is, the battery according to Embodiment 10 shows a more improved output characteristic than the battery of Comparative Example 1.

As shown in the above results, when bis(trimethylsilyl) fumarate or bis(trimethylsilyl)thiophene-2,5-dicarboxylate having low resistance compared to VC is used as a negative film type additive, the output characteristic may be improved.

Thereafter, the output and life characteristics of a lithium secondary battery when VC is added will be described.

Embodiments 13 and 14

Embodiments 13 and 14 are performed in the same way as in Embodiments 1 to 6 except that any one of bis (trimethylsilyl)fumarate and bis(trimethylsilyl)thiophene-2, 5-dicarboxylate is used as an electrolyte additive, together with VC.

Embodiments 15 and 16

Embodiments 15 and 16 are performed in the same way as in Embodiments 13 and 14 except that Trimethyl(phenyl) silane is added.

Comparative Example 2

Comparative Example 2 is performed in the same way as in Comparative Example 1 except that a VC content as an additive is 1 wt %.

The output and life characteristics of lithium secondary batteries manufactured under conditions shown in Table 3 were evaluated, and the evaluation results are shown in Table 4 below.

TABLE 3

| | Additive | | | |
|---|---|---|---|---|
| | VC | Bis(trimethyl-silyl)fumarate | Bis(trimethyl-silyl)thiophene-2,5-dicarboxylate | Tri-methyl(phe-nyl)silane |
| Comparative Example 2 | 1 | | | |
| Embodiment 13 | 0.5 | 0.5 | | |
| Embodiment 14 | 0.5 | | 0.5 | |
| Embodiment 15 | 0.5 | 0.5 | | 1.0 |
| Embodiment 16 | 0.5 | | 0.5 | 1.0 |

TABLE 4

| | Life Characteristic @ 100 cycles | | After High-Temperature Storage | Electrolyte Ion |
|---|---|---|---|---|
| | Maintenance ratio (%) | Resistance (%) | Resistance (%) | Conductance (mS/cm) |
| Comparative Example 2 | 95 | 100 | 100 | 8.53 |
| Embodiment 13 | 95 | 92 | 96 | 8.78 |
| Embodiment 14 | 95 | 93 | 97 | 8.72 |
| Embodiment 15 | 96 | 89 | 93 | 8.85 |
| Embodiment 16 | 96 | 91 | 94 | 8.81 |

Figure 2:
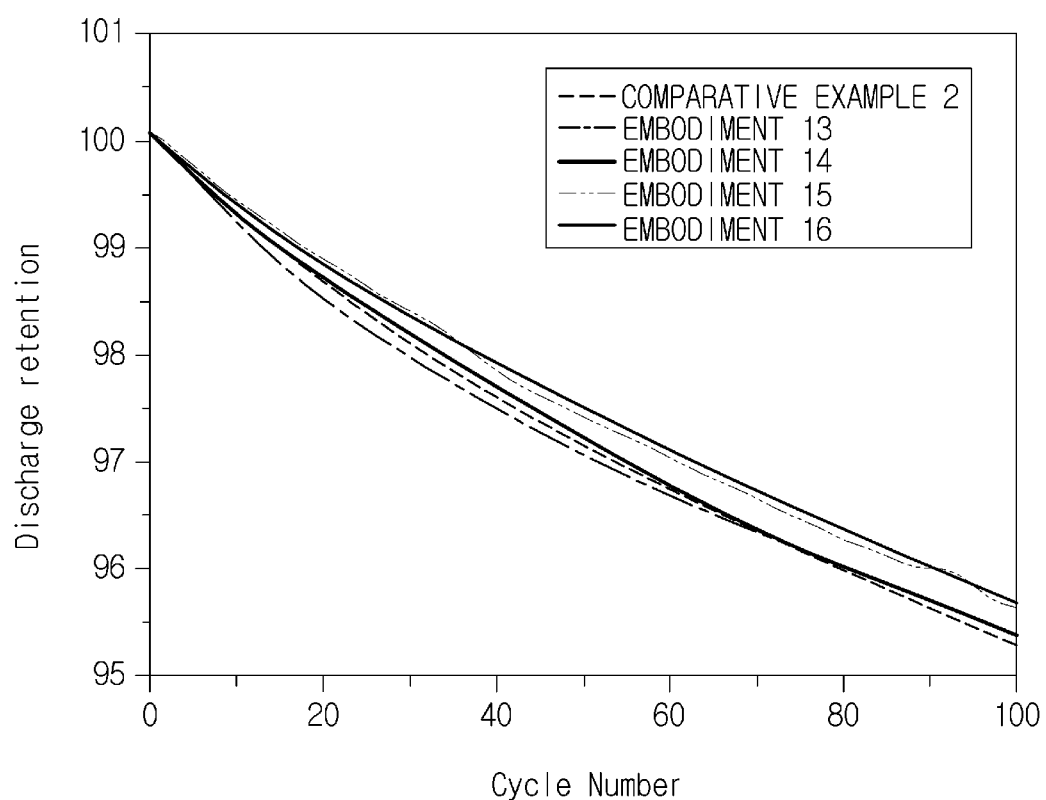
FIG. 2 shows discharge retention (%) of an exemplary lithium secondary battery according to an exemplary embodiment of the present invention.
Figure 3:
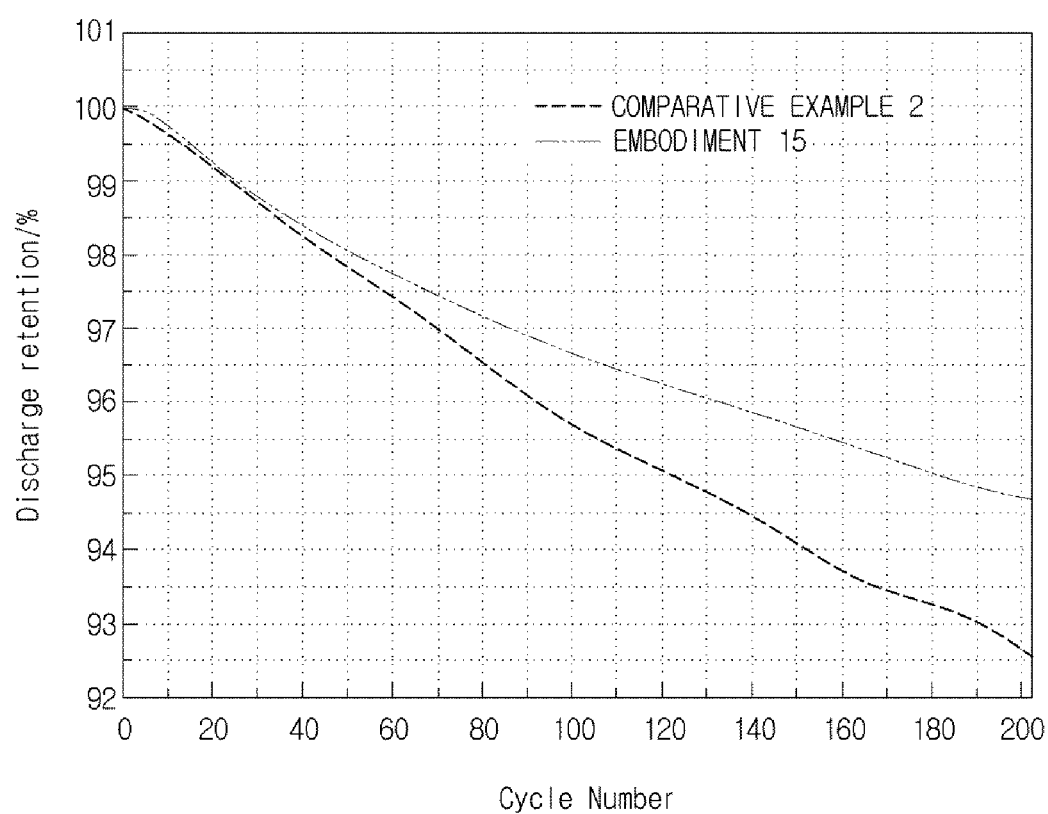
FIG. 3 shows discharge retention (%) of an exemplary lithium secondary battery according to an exemplary embodiment of the present invention.

FIG. 2 is a graph showing the measurement results of battery life characteristics for 100 cycles according to Embodiments 13 to 16 and Comparative Example 2. FIG. 3 is a graph showing the measurement results of battery life characteristics for 200 cycles according to Embodiment 15 and Comparative Example 2.

As shown in Table 2 and FIG. 3, a lithium secondary battery according to Embodiment 15 maintained high capacity of 94.5% or greater with respect to initial capacity even after 200 cycles, compared to a lithium secondary battery according to Comparative Example 2.

A battery according to Embodiment 13 has a resistance characteristic of 92% after 100 cycles, and a resistance characteristic of 96% after high-temperature storage. Therefore, the battery according to Embodiment 13 shows a more improved output characteristic than the battery of Comparative Example 2.

A battery according to Embodiment 14 has a resistance characteristic of 93% after 100 cycles, and a resistance characteristic of 97% after high-temperature storage. Therefore, the battery according to Embodiment 14 shows a more improved output characteristic than the battery of Comparative Example 2.

The battery according to Embodiment 15 has a resistance characteristic of 89% after 100 cycles, and a resistance characteristic of 93% after high-temperature storage. Therefore, the battery according to Embodiment 15 shows a more improved output characteristic than the battery of Comparative Example 2. Also, the battery according to Embodiment 15 shows a more improved cycle characteristic than the battery of Comparative Example 2.

A battery according to Embodiment 16 has a resistance characteristic of 91% after 100 cycles, and a resistance characteristic of 94% after high-temperature storage. Therefore, the battery according to Embodiment 16 shows a more improved output characteristic than the battery of Comparative Example 2. Also, the battery according to Embodiment 16 shows a more improved output characteristic than the battery of Comparative Example 2.

As shown in the above discussed results, when bis(trimethylsilyl)fumarate or bis(trimethylsilyl)thiophene-2,5-dicarboxylate is used together with VC, the cell resistance is improved while reducing the VC content. Also, it is confirmed from Embodiments 15 and 16 that if Trimethyl (phenyl)silane is added, the life characteristic is improved.

Thereafter, the life characteristic when VC and trimethyl (phenyl)silane are added together will be described.

Embodiments 17 to 30

Embodiments 17 to 30 are performed in the same way as in Embodiments 1 to 6 except that at least one of bis (trimethylsilyl)fumarate and bis(trimethylsilyl)thiophene-2, 5-dicarboxylate is mixed with trimethyl(phenyl)silane and VC as an electrolyte additive.

The life characteristics of lithium secondary batteries manufactured using different contents of VC, bis(trimethylsilyl)fumarate, bis(trimethylsilyl)thiophene-2,5-dicarboxylate, and trimethyl(phenyl)silane were evaluated, and the evaluation results are shown in Table 5 below.

TABLE 5

| | Additive | | | | Life Characteristic |
|---|---|---|---|---|---|
| | VC | Bis(trimethylsilyl) fumarate | Bis(trimethylsilyl) Thiophene-2,5- dicarboxylate | Trimethyl (phenyl) silane | @ 200 cycles Maintenance Ratio (%) |
| Comparative Example 2 | 1 | | | | 92.5 |
| Embodiment 17 | 0.5 | 0.5 | | 0.2 | 94.1 |
| Embodiment 18 | 0.5 | 0.5 | | 0.5 | 94.7 |
| Embodiment 19 | 0.5 | 0.5 | | 1 | 93.9 |
| Embodiment 20 | 0.5 | 0.5 | | 1.5 | 94.0 |
| Embodiment 21 | 0.5 | | 0.5 | 0.2 | 93.8 |
| Embodiment 22 | 0.5 | | 0.5 | 0.5 | 94.6 |
| Embodiment 23 | 0.5 | | 0.5 | 1 | 93.6 |
| Embodiment 24 | 0.5 | | 0.5 | 1.5 | 93.4 |
| Embodiment 25 | 0.5 | 0.4 | 0.1 | 0.5 | 94.1 |
| Embodiment 26 | 0.5 | 0.25 | 0.25 | 0.5 | 94.5 |
| Embodiment 27 | 0.5 | 0.1 | 0.4 | 0.5 | 94.3 |
| Embodiment 28 | 0.5 | 0.25 | 0.25 | 0.2 | 94.4 |
| Embodiment 29 | 0.5 | 0.25 | 0.25 | 0.7 | 94.5 |
| Embodiment 30 | 0.5 | 0.25 | 0.25 | 1 | 94.5 |

Figure 4:
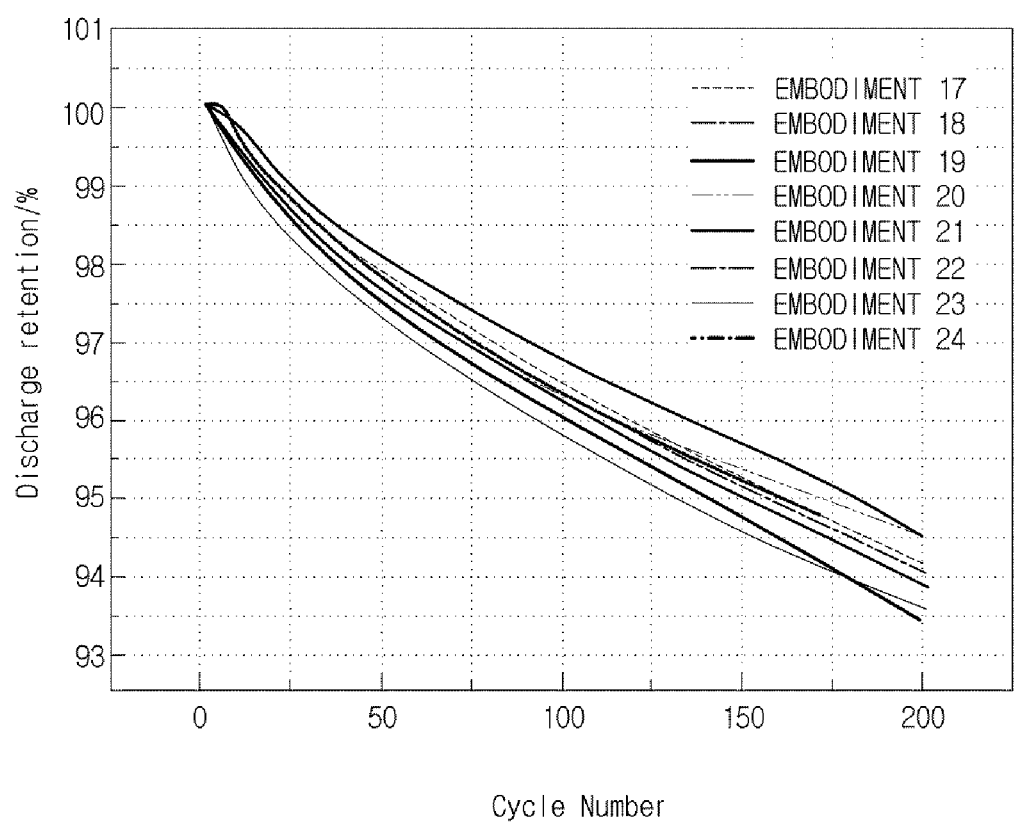
FIG. 4 shows discharge retention (%) of an exemplary lithium secondary battery according to an exemplary embodiment of the present invention.
Figure 5:
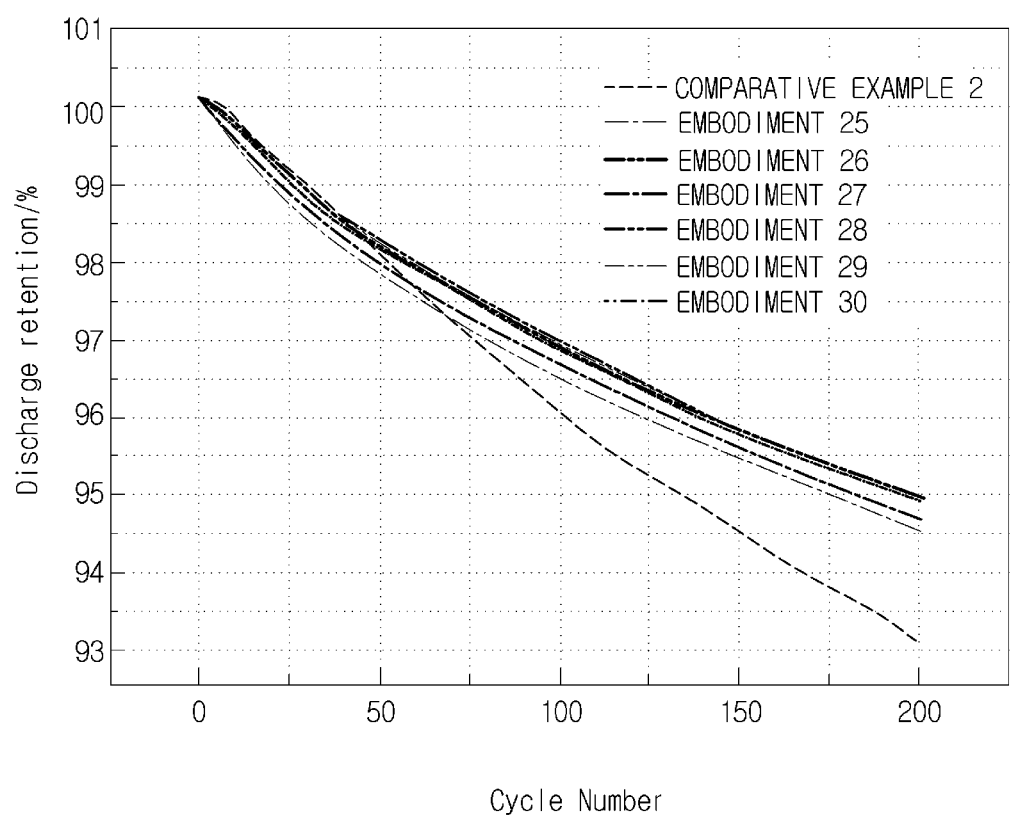
FIG. 5 shows discharge retention (%) of an exemplary lithium secondary battery according to an exemplary embodiment of the present invention.

FIGS. 4 and 5 are graphs showing the measurement results of battery life characteristics for 200 cycles according to Embodiments 17 to 30 and Comparative Example 2.

As shown in Table 5 and FIG. 4, lithium secondary batteries according to Embodiments 17 to 20 in which VC, bis(trimethylsilyl)fumarate, and bis(trimethylsilyl)thiophene-2,5-dicarboxylate are mixed maintained high capacity of 93.9% or more with respect to initial capacity even after 200 cycles, compared to the lithium secondary battery according to Comparative Example 2 in which only VC is added.

As shown in Table 5 and FIG. 4, lithium secondary batteries according to Embodiments 21 to 24 in which VC, bis(trimethylsilyl)thiophene-2,5-dicarboxylate, and trimethyl(phenyl)silane are mixed maintained high capacity of 93.4% or more with respect to initial capacity even after 200 cycles, compared to the lithium secondary battery according to Comparative Example 2.

As shown in Table 5 and FIG. 5, lithium secondary batteries according to Embodiments 25 to 30 in which VC, bis(trimethylsilyl)fumarate, bis(trimethylsilyl)thiophene-2, 5-dicarboxylate, and trimethyl(phenyl)silane are mixed maintained high capacity of 94.1% or more with respect to initial capacity even after 200 cycles, compared to the lithium secondary battery according to Comparative Example 2.

However, as shown in Table 1 and Table 2, in Embodiments 6 to 12 in which the bis(trimethylsilyl)fumarate or bis(trimethylsilyl)thiophene-2,5-dicarboxylate content is 5%, it is confirmed that the output and life characteristics deteriorate. Accordingly, two kinds or more of additives were not mixed in consideration of the efficiency of the cell. Accordingly, it is confirmed that an appropriate additive content is within a range of 0.5 wt % to 2.5 wt %, preferably, within a range of 1 wt % to 2.5 wt % with respect to the electrolyte composite.

Referring to Embodiments 1 to 30, the additives may be manufactured by using bis(trimethylsilyl)fumarate and bis (trimethylsilyl)thiophene-2,5-dicarboxylate alone or by using bis(trimethylsilyl)fumarate and bis(trimethylsilyl) thiophene-2,5-dicarboxylate together with VC and trimethyl (phenyl)silane.

The electrolyte composite according to various exemplary embodiments of the present invention may improve the initial and high-temperature output characteristics while reducing the VC content, and also compensate water vulnerability to improve the life characteristic of the lithium secondary battery. Accordingly, the lithium secondary battery including the electrolyte composite of the present invention may be applied to medium- and large-size lithium secondary batteries for vehicle requiring a high output and a long life cycle.

The electrolyte for the lithium secondary battery according to an aspect may use, as an additive, at least one of bis(trimethylsilyl)fumarate and bis(trimethylsilyl)thiophene-2,5-dicarboxylate forming a film on the negative active material to increase a life cycle so as to implement a low resistance characteristic while reducing the VC content, thereby improving the output of the lithium secondary battery. Therefore, the electrolyte for the lithium secondary battery may be effectively applied to medium- and large-size batteries.

Also, by using, as an additive, trimethyl(phenyl)silane capable of suppressing the generation of HF deteriorating the life cycle of the positive active material including Ni, Co, and Mn to compensate water vulnerability, the electrolyte may improve the life cycle of the lithium secondary battery.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electrolyte composite for a lithium secondary battery, comprising:
    a lithium salt; and
    an additive comprising Bis(trimethylsilyl)fumarate or Bis(trimethylsilyl)thiophene-2,5-dicarboxylate,
    wherein a content of the additive is within a range of 0.2 wt % to 3 wt % with respect to the total weight of the electrolyte composite, and
    wherein the additive further comprises trimethyl(phenyl) silane in an amount of 0.5 wt % to 5 wt % with respect to the total weight of the electrolyte, and
    wherein the additive further comprises the vinylene carbonate (VC) in an amount of 0.5 wt %.

2. A lithium secondary battery, comprising:
    a positive electrode comprising a positive active material;
    a negative electrode comprising a negative active material;
    a separation film disposed between the positive electrode and the negative electrode; and
    an electrolyte,
    wherein the electrolyte comprises:
    a lithium salt; and
    an additive comprising at least one of bis(trimethylsilyl) fumarate and bis(trimethylsilyl)thiophene-2,5-dicarboxylate,
    wherein a content of the additive is within a range of 0.2 wt % to 3 wt % with respect to the total weight of the electrolyte composite, and
    wherein the additive further comprises trimethyl(phenyl) silane in an amount of 0.5 wt % to 5 wt % with respect to the total weight of the electrolyte, and
    wherein the additive further comprises the vinylene carbonate(VC) in an amount of 0.5 wt %.

3. The lithium secondary battery of claim 2, wherein the lithium salt is one or more materials selected from the group consisting of $LiPF_6$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$ (LiFSI) and $(CF_3SO_2)_2NLi$.

4. The lithium secondary battery of claim 2, wherein the electrolyte further comprises a solvent comprising one or more materials selected from a group consisting of ethylene carbonate (EC), diethyl carbonate (DEC), dimethyl carbonate (DMC), propylene carbonate (PC), dipropyl carbonate (DPC), buthylene carbonate (BC), methyl propyl carbonate (MPC), ethyl propyl carbonate (EPC), and ethyl methyl carbonate (EMC).

5. The lithium secondary battery of claim 2, wherein the positive active material comprises a lithium nickel-manganese-cobalt ternary positive active material comprising nickel (Ni) in an amount of 30 wt % to 100 wt % with respect to the total weight of the positive active material.

6. The lithium secondary battery of claim 2, wherein the separation film comprises a ceramic coating separation film.

7. A vehicle comprising a lithium secondary battery of claim 2.

* * * * *